(No Model.)

J. W. HARMON.
Leveling Instrument.

No. 234,709. Patented Nov. 23, 1880.

Witnesses
S. N. Piper
W. W. Lunt

Inventor
John W. Harmon
by attorney
R. H. Eddy

UNITED STATES PATENT OFFICE.

JOHN W. HARMON, OF BOSTON, MASSACHUSETTS.

LEVELING-INSTRUMENT.

SPECIFICATION forming part of Letters Patent No. 234,709, dated November 23, 1880.

Application filed October 4, 1880. (No model.)

*To all whom it may concern:*

Be it known that I, JOHN W. HARMON, of Boston, in the county of Suffolk and State of Massachusetts, have invented a new and useful Improvement in Artificers' Levels; and I do hereby declare the same to be described in the following specification and represented in the accompanying drawings, of which—

Figure 1:
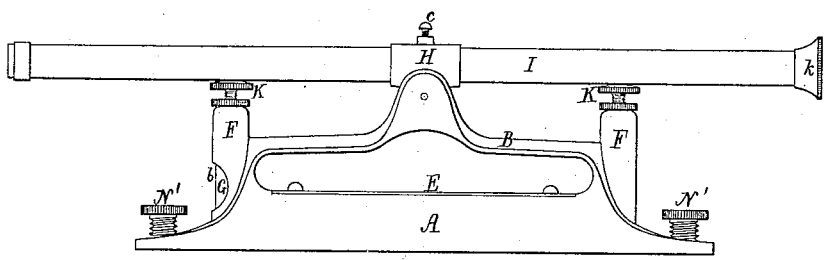
Figure 2:
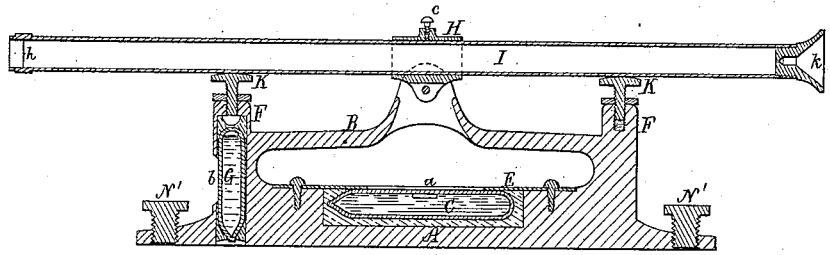
Figure 3:
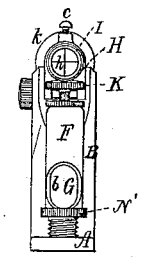

Figure 1 is a side elevation, Fig. 2 a longitudinal section, and Fig. 3 an end view, of an instrument embracing my invention, the nature of which is duly defined in the claims hereinafter made.

In the drawings, A represents the instrument-base, it being straight on its bottom or lower edge. There projects up from such base an arched standard and level-guard, B, it being formed and arranged as shown. Within the base is a spirit-level, C, the former being troughed or chambered to receive the latter, and provided with a cap-plate, E, to cover it. This cap-plate has a slot, $a$, in it over the level, to render visible the air-bubble of the latter. Furthermore, the base is provided with two projections, F F, one of which is adapted to receive another spirit-level, G, which is arranged at a right angle to the level herein first named, there being in the side of the socketed projection an opening or slot, $b$, to admit of the air-bubble of the level G being seen as occasion may require.

There is pivoted to the standard B, at its crown or middle part, a socket-piece, H, to receive and support a telescope or sight tube, I, which extends through the socket-piece and is held in place therein by means of a clamp-screw, $c$, screwed into the socket-piece and against the tube. The said telescope or sight tube rests upon the milled heads of two adjusting-screws, K K, which are screwed into the projections at the ends of the arched standard, and arranged therein and with the tube and its socket-piece, in manner as represented. These screws serve to properly adjust the telescope or sight tube with reference to either of the spirit-levels, and especially to bring it into parallelism with the lower surface of the base, which is to be supposed to be arranged in parallelism with the axis of the spirit-level C, covered and protected by the arched standard.

I would remark that the telescope or sight tube may be pivoted at its middle directly to the crown of the arched standard; but it is preferable to have it applied thereto by means of the separate socket-piece, as described, arranged with and adapted to the standard in manner as explained.

Figure 4:
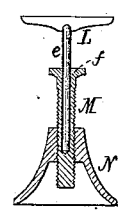

In connection with the above-described instrument, there may be used an adjustable target or apparatus, a vertical section of which is given in Fig. 4, it consisting of a "T-piece," L, a screw, M, and a standard, N, formed as shown. The shank $e$ of the T-piece or target is cylindrical and inserted in a correspondingly-shaped socket, $f$, made axially in the screw. The said screw screws down into the standard, and serves to adjust the target to different altitudes in respect to such standard, as occasion may require.

Besides the screws K, the instrument may be provided with one or more adjusting-screws, N', arranged in its base in manner as represented, such being to enable the base to be brought into a horizontal plane when resting on a surface somewhat inclined thereto.

The telescope or sight tube I provide with a proper fore sight or crossed wires diametrically arranged in it at right angles to each other, they being shown at $h$. The tube also has a suitable back sight or eye-piece, $k$.

An artificer's level constructed as described becomes a convenient, cheap, and desirable article for use by masons, joiners, or machinists for leveling. It can also be employed for defining inclinations or slopes.

What I claim as my invention is as follows, viz:

1. The combination of the straight-edged base A, provided with one or more spirit-levels, C G, arranged as set forth, with the arched standard or level-guard B, and with the telescope or sight tube I and its adjusting-screws K K, arranged therewith as represented.

2. The combination of the straight-edged base A, provided with one or more spirit-levels, C G, arranged as set forth, with the arched standard or level-guard B, and with the telescopic or sight tube socket-piece H and adjusting-screws K K, arranged with and adapted to said guard substantially as shown and described.

3. The combination of the straight-edged base A, provided with one or more spirit-levels, C G, arranged as set forth, with the arched standard or level-guard B, and with the sight tube or telescope I, and its socket-piece H, and adjusting-screws K K, arranged with and adapted to such standard or guard substantially as represented.

4. The combination of the straight-edged base A, provided with one or more adjusting-screws, N', and one or more spirit-levels, C G, arranged in it as set forth, with the arched standard or level-guard B, and with the telescope or sight tube I and its adjusting-screws K K, arranged with and applied thereto substantially as specified.

5. The combination of the telescope or sight tube socket-piece H and the adjusting-screws K K with the arched standard B.

6. The combination of the telescope or sight tube I, its socket-piece H and adjusting-screws K K, and the arched standard B, all arranged and applied substantially as set forth.

JOHN W. HARMON.

Witnesses:
R. H. EDDY,
WM. W. LUNT.